(12) United States Patent
Sardella et al.

(10) Patent No.: US 8,103,801 B1
(45) Date of Patent: Jan. 24, 2012

(54) MARKING AND FAULTING INPUT/OUTPUT PORTS OF AN ELECTRONICS SYSTEM

(75) Inventors: Steven D. Sardella, Hudson, MA (US); Stephen Strickland, Foxboro, MA (US); Thomas N. Dibb, Rutland, MA (US)

(73) Assignee: EMC Corporation, Hopkinton, MA (US)

( * ) Notice: Subject to any disclaimer, the term of this patent is extended or adjusted under 35 U.S.C. 154(b) by 232 days.

(21) Appl. No.: 11/864,115

(22) Filed: Sep. 28, 2007

(51) Int. Cl.
*G06F 3/00* (2006.01)
(52) U.S. Cl. .................. 710/1; 710/15; 710/18; 710/19
(58) Field of Classification Search ................... None
See application file for complete search history.

(56) References Cited

U.S. PATENT DOCUMENTS

| | | | | |
|---|---|---|---|---|
| 5,379,141 | A * | 1/1995 | Thompson et al. | 398/91 |
| 5,901,151 | A | 5/1999 | Bleiweiss et al. | |
| 7,127,638 | B1 | 10/2006 | Sardella et al. | |
| 7,216,188 | B2 | 5/2007 | Reid et al. | |
| 7,808,380 | B1 * | 10/2010 | Harel et al. | 340/540 |
| 2002/0005826 | A1 * | 1/2002 | Pederson | 345/82 |
| 2002/0144191 | A1 * | 10/2002 | Lin | 714/46 |
| 2003/0164771 | A1 * | 9/2003 | Dove et al. | 340/679 |
| 2005/0186810 | A1 | 8/2005 | Sardella et al. | |
| 2006/0064526 | A1 * | 3/2006 | Smith et al. | 710/104 |
| 2006/0074927 | A1 | 4/2006 | Sullivan et al. | |
| 2006/0292901 | A1 | 12/2006 | Sardella et al. | |
| 2007/0274074 | A1 * | 11/2007 | Smires et al. | 362/253 |

OTHER PUBLICATIONS

PCA9552—16-bit I2C-bus LED driver with programmable blink rates, Mar. 9, 2006, NXP, http://www.nxp.com/#/pip/pip=[pip=PCA9552_5]|pp=[t=pip,i=PCA9552_5].*
Specification of pending U.S. Appl. No. 11/731,427, filed Mar. 30, 2007.
Specification of pending U.S. Appl. No. 11/731,254, filed Mar. 30, 2007.

* cited by examiner

*Primary Examiner* — Henry Tsai
*Assistant Examiner* — Kris Rhu
(74) *Attorney, Agent, or Firm* — Guerin & Rodriguez, LLP; Michael A. Rodriguez

(57) ABSTRACT

Described is an electronics system and method for marking and faulting I/O ports of an I/O module in the electronics system. Each I/O port has an associated light-emitting system that is capable of emitting a plurality of different colors. At least one color is blinked at a first rate to produce a first status indicator for the I/O port. Each color of the different colors is alternately blinked at a second rate to produce a second status indicator for the I/O port. One of the status indicators is for marking the I/O port and the other status indicator is for faulting the I/O port. In one embodiment, the light-emitting system includes a plurality of differently colored LEDs. In another embodiment, the light-emitting system includes only one multicolor LED. Various I/O technologies including Fiber Channel, Fiber Connectivity, Ethernet, serial attached SCSI, IPsec, Infiniband, and iSCSI, can implement marking and faulting.

19 Claims, 4 Drawing Sheets

MARKING AND FAULTING INPUT/OUTPUT PORTS OF AN ELECTRONICS SYSTEM

RELATED APPLICATIONS

This utility application is a continuation-in part application claiming priority to co-pending U.S. patent application Ser. No. 11/170,983, filed on Jun. 6, 2005, the entirety of which U.S. patent application is incorporated by reference herein.

FIELD OF THE INVENTION

The present invention relates generally to electronics systems.

More particularly, the present invention relates to systems and methods for providing visual status indicators for faulting and marking input/output (I/O) ports of an electronics system.

BACKGROUND

Input/output (I/O) ports of storage arrays are available in a variety of speeds and technologies, for example, Fibre Channel, Ethernet, and serial attached SCSI (SAS). Depending on the specific I/O technology, an I/O port can have one or more associated light-emitting devices (LEDs) that visually convey technology-specific status information, for example, link established, activity, and port speed. Some I/O ports have connectors with these LEDs embedded in the connector (e.g., RJ45); other I/O ports have the LEDs placed externally adjacent the connector.

Occasionally, the electronics industry encounters a need to provide a status indicator of another type for an I/O port. A tempting solution might be to add one or more LEDs near the I/O port to accommodate the new status indicator. With the density of I/O ports within an I/O module ever increasing, however, the available space on the bezel of the I/O module for placement of additional LEDs is conversely disappearing. Moreover, multiple, compactly placed I/O ports having many LEDs of different colors that are blinking and flickering is more likely to present a confusing display to field service personnel, and to customers who service the system themselves, than to convey important status information.

SUMMARY

In one aspect, the invention features a method for marking and faulting the I/O port of an I/O module in an electronics system. The method comprises associating a light-emitting system with the I/O port. The light-emitting system is capable of emitting a plurality of different colors at the I/O port. The light-emitting system emits at least one of the plurality of different colors at a first rate to produce a first status indicator for the I/O port. The light-emitting system emits each color of the plurality of different colors at a second rate to produce a second status indicator for the I/O port. One of the status indicators is for marking the I/O port and the other status indicator is for faulting the I/O port.

In another aspect, the invention features an electronics system comprising an I/O module with an I/O port and a light-emitting system associated with the I/O port. The light-emitting system is capable of emitting a plurality of different colors near the I/O port. The electronics system also includes logic for emitting at least one of the plurality of different colors from the light-emitting system at a first rate to produce a first status indicator for the I/O port, and logic for alternately emitting each color of the plurality of different colors from the light-emitting system at a second rate to produce a second status indicator for the I/O port. One of the status indicators is for marking the I/O port and the other status indicator is for faulting the I/O port.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

DETAILED DESCRIPTION

Figure 1:
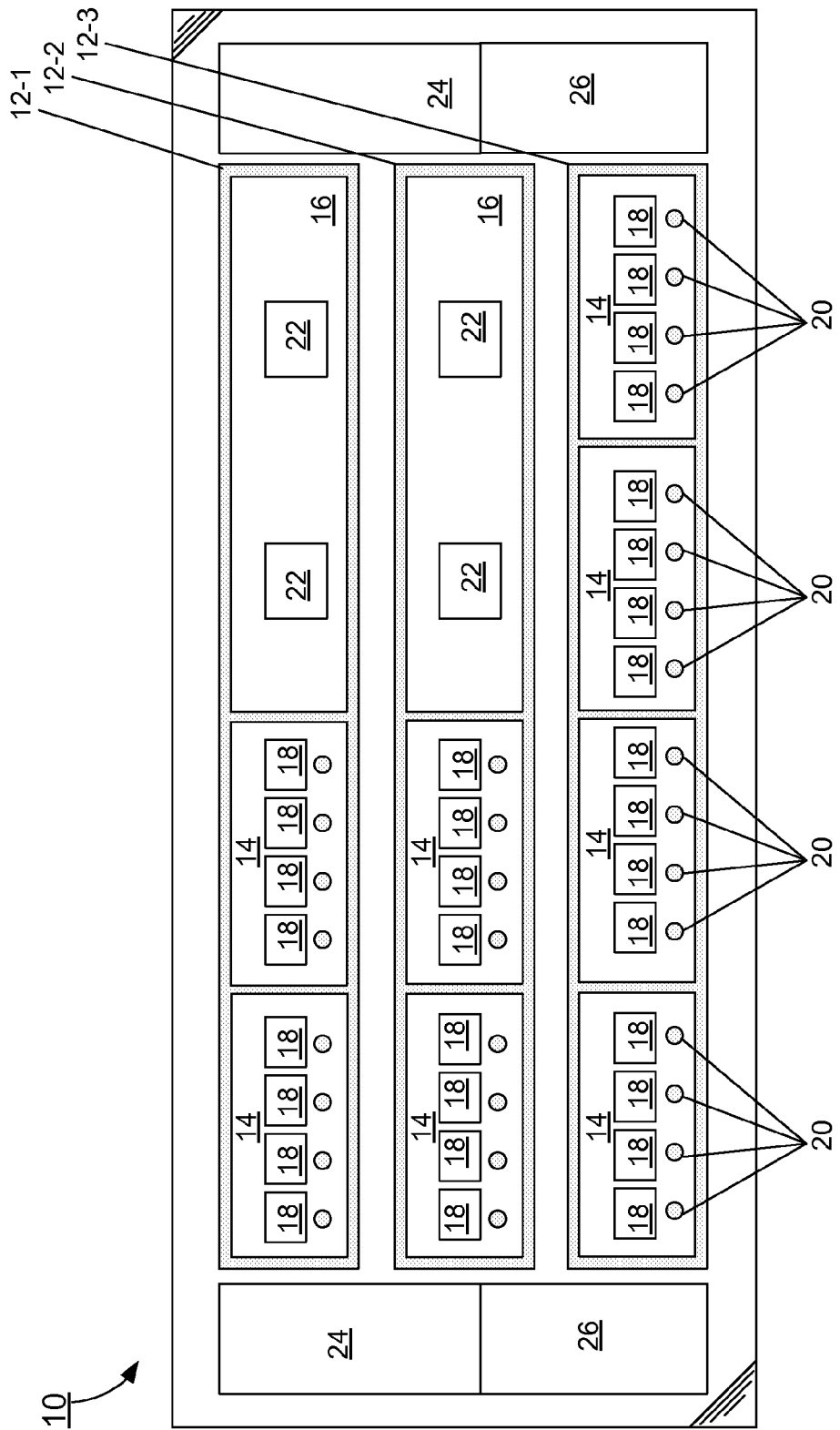
FIG. 1 is a diagram of an embodiment of a storage system embodying the invention, the storage system having I/O ports that communicate according to the Fibre Channel protocol and that each have one multicolor LED disposed nearby.

Systems embodying the present invention include distinct mechanisms for marking and faulting an I/O port of an I/O module. Marking is a technique by which to draw attention to an I/O port without signifying that the I/O port is malfunctioning. The technique can prove useful during tasks such as installing, upgrading, or servicing an I/O port. During such tasks, the I/O port is not faulty, but needs to stand out from the other I/O ports on the I/O module, in order to direct personnel to the I/O port. For example, marking can be implemented from a remote site, to guide personnel working at the storage array through a cabling procedure (i.e., connect the cable from this marked I/O port to that marked I/O port). Practical uses for marking are described in U.S. patent application Ser. No. 11/731,426, titled "Detecting Port Configurations", filed Mar. 30, 2007, and in U.S. patent application Ser. No. 11/731,254, titled, "Managing Storage System Modules", filed Mar. 30, 2007, the entirety of which applications are incorporated by reference herein.

Faulting draws attention to a given I/O port to indicate that the I/O port is not operating properly and may need replacement. For example, an optical transceiver, such as an SFP (single form pluggable) or XFP (small form-factor pluggable), can fail internal diagnostics, report an error, or signal an alarm condition.

The marking and faulting mechanisms of the invention use the number of LEDs presently existing for each type of I/O technology; no additional LEDs are added to any I/O port in order to implement the mechanisms. In general, the marking and faulting mechanisms use a minimum of two light-emitting devices (LEDs) or a single multicolor LED, depending on the technology of the I/O port. Because the mechanisms use existing LEDs to add faulting and marking capabilities to existing status indicators, prioritization among the various indicators determines the behavior of the LEDs should more than one status condition occur simultaneously.

The design of the marking and faulting mechanisms and their prioritization aims to provide consistent LED signaling across different storage platforms. Accordingly, field service personnel can rely on an observed LED-signaling pattern to have a specific meaning, irrespective of the type of storage platform being serviced.

In brief overview, the marking and faulting mechanisms vary slightly depending on whether an I/O port has multiple LEDs or a single multicolor LED only. For multiple LEDs, the marking mechanism blinks all LEDs synchronously at a given flash rate. For a single multi-color LED, the marking mechanism selects one of the multiple colors of that LED and blinks that color at the given flash rate. The color selected may be any one of the multiple colors. The ability to mark an I/O port operates independently of whether the I/O port has an established link; that is, the marking mechanism can mark an I/O port although the I/O port has no established link.

To fault an I/O port having multiple LEDs, the faulting mechanism alternately blinks the LEDs at a given rate. For faulting an I/O port having only one multicolor LED, the faulting mechanisms alternately blinks each of the different colors of the LED at a given rate. Table 1 summarizes the LED signaling patterns for marking and for faulting.

TABLE 1

| No. of LEDs | No. of Colors | Marking | Faulting |
|---|---|---|---|
| 1 | ≧2 | SELECT ONE COLOR AND BLINK AT A DEFINED RATE | ALTERNATELY BLINK COLORS AT A DEFINED RATE |
| 2 | ≧2 | BLINK ALL LEDS SYNCHRONOUSLY AT A DEFINED RATE | ALTERNATELY BLINK LEDS AT A DEFINED RATE |

Accordingly, whether a given I/O port has only one LED or multiple LEDs, the LED signaling for marking an I/O port is readily distinguishable from the LED signaling for faulting an I/O port. In addition, the alternate blinking of colors carries an intuitive sense of an alarm condition that is more suitable for signaling a fault than for marking. Notwithstanding, in another embodiment, the LED signaling patterns for marking and faulting can be reversed without departing from the principles of the invention.

FIG. 1 show a front view of an embodiment of a storage system 10 having a plurality of blades 12-1, 12-2, and 12-3 (generally, 12). Blades may also be known as storage processors, directors, or data movers. Each of the blades 12-1, 12-2 includes two I/O modules 14 and a serial rapid I/O (SRIO) interface 16. Each SRIO 16 includes connectors 22 by which the respective blade 12 connects to redundant fabrics. The third blade 12-3 includes four I/O modules 14. Each I/O module 14 includes a plurality of I/O ports 18. Either an optical connector or a copper connector can be plugged into each I/O port 18. Located near each I/O port 18 is a LED system comprised of one bicolor LED 20. The storage system 10 also includes redundant power supplies 24 and network management modules 26. The storage system 10 is a representative example of an electronics system in which the marking and faulting mechanisms of the invention may be implemented.

In this exemplary embodiment, each of the I/O ports 18 communicates in accordance with the Fibre Channel protocol. Each bicolor LED 20 can emit two colors: green and blue. These two colors distinguish between possible operational speeds of the I/O port: 1/2 Gps and 4 Gps. When the LED is solid green (constant, non-blinking illumination), the I/O port has established either a 1 Gb or a 2 Gb link. When the LED is solid blue, the I/O port has established a 4 Gb link.

In accordance with the invention, to mark a given I/O port 18 one of these two colors is selected for blinking at a defined flash rate. In one embodiment, the flash rate is 1 Hz and the selected color is blue. The rhythmic blinking should be sufficiently distinguishing from solid illumination to alert field service personnel that the I/O port is marked (rather than to signify the I/O port speed). To fault a given I/O port 18, the two colors are alternately blinked at a defined flash rate (i.e., blue, then green, then blue, and so on). In one embodiment, the flash rate is 1 Hz. Other embodiments may define a different flash rate for marking or for flashing without departing from the invention.

Storage systems supporting 8 Gb Fibre Channel may use a tricolor LED to represent three different operational rates: 1/2 Gps, 4 Gps, and 8 Gps. The color white can be associated with the 8 Gps rate, with green continuing to represent 1/2 Gps and blue representing 4 Gps. To implement the marking mechanism for I/O ports operating in such storage systems, one of the three colors is selected and blinked at a defined flash rate. To fault an I/O port, the three colors are alternately blinked at a given flash rate (e.g., blue, green, white, blue, green, white, and so on). An alternative implementation of faulting can select two of the three colors (e.g., green and blue) and alternately blink just those two colors.

Other types of I/O port technology, such as the SAS and Fiber Connectivity (FICON) protocols, also have only one multicolor LED available for implementing the marking and faulting mechanisms of the invention. Marking and faulting I/O ports that operate according to these protocols use the same LED-signaling patterns as those described for the Fibre Channel I/O ports 18.

Figure 2:
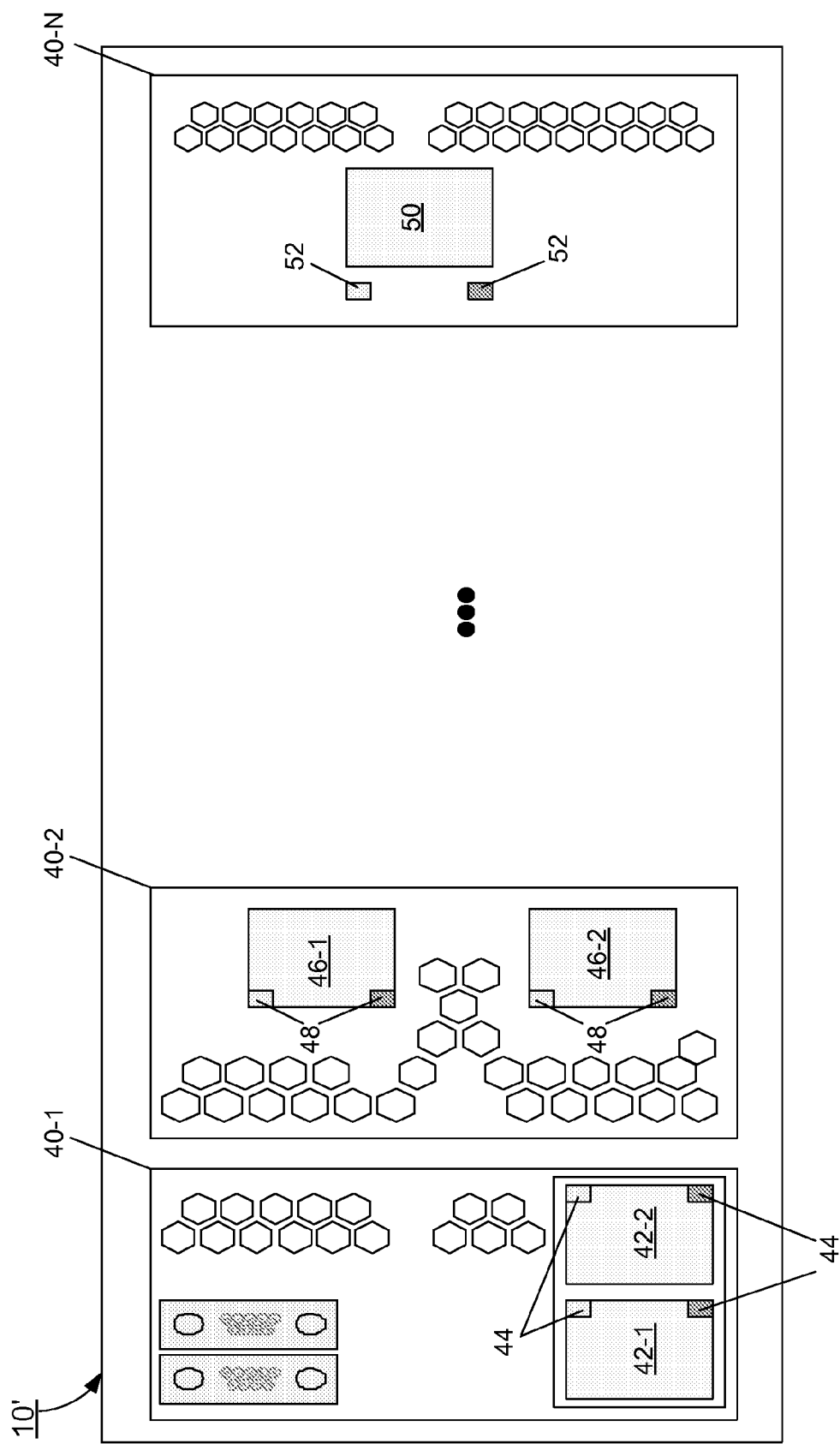
FIG. 2 is a diagram of another embodiment of a storage system embodying the invention, the storage system having some I/O ports that communicate according to an Ethernet protocol, other I/O ports that communicate according to an iSCSI (Internet SCSI) protocol, and another I/O port that communicates according to an Optical Ethernet protocol.

Other types of I/O port technology have two LEDs available for implementing marking and faulting. Examples of such technologies include, but are not limited to, Ethernet (10/100/1000 Base-T), iSCSI, IPsec (Internet Protocol Security), SRIO, and Infiniband. FIG. 2 shows a rear view of another embodiment of a storage system 10' embodying the present invention. The storage system 10' includes a plurality of I/O modules 40-1, 40-2, 40-N (generally, 40). As signified by the ellipsis, the storage system 10' can have more I/O modules 40 than those shown.

The I/O module 40-1 includes two I/O ports 42-1 and 42-2 (generally, 42) that communicate according to an Ethernet protocol (e.g., 10/100/1000 Base-T and 10 GbE). Each I/O port 42 has an RJ-45 connector with embedded LEDs 44: an amber LED and a green LED. The I/O module 40-2 includes two I/O ports 46-1, 46-2 (generally, 46) that communicate according to the iSCSI (Internet SCSI) protocol. These I/O ports 46 also have RJ-45 connectors with embedded amber and green LEDs 48. The I/O module 40-N includes one I/O port 50 for Optical Ethernet (e.g., SFP, XFP) with two external green and amber LEDs 52. These I/O modules 40 are exemplary, used for illustrating the principles of marking and faulting as applied to I/O ports having an LED system comprised of two LEDs.

During normal operation of each type of I/O port 42, 46, 50, the green LED indicates that the I/O port has an established link and the amber LED indicates activity on the link. The amber LED flickers randomly in accordance with the activity, whereas the green LED remains constantly illuminated. When the amber LED is off, the associated I/O port has no traffic (i.e., is idle). When the green LED is off, the associated I/O port has no established link.

To mark any of the I/O ports 42, 46, 50, the amber and green LEDs both blink synchronously and regularly at a defined flash rate. The regularity of the blinking distinguishes the marked I/O port from normal traffic activity, which flickers the amber LED randomly. A faulted I/O port is indicated by alternately blinking the amber and green LEDs at a defined flash rate. For example, one second after the first LED blinks on and off, the second LED blinks on and off, followed one second later by the first LED blinking on and off, and so on. In one embodiment, the flash rates for both marking and faulting are 1 Hz. Other embodiments may use different flash rates without departing from the invention.

Prioritization Scheme

Conceivably, two or more status conditions (i.e., faulting, marking, activity, idle) can arise simultaneously for a given I/O port. A prioritization scheme governs the various status conditions to determine which LED-signaling pattern controls in the event of a simultaneous occurrence. In addition, this prioritization scheme is applied to every type of I/O port, irrespective of its type of I/O technology, to ensure consistent behavior among storage systems of different communication protocols. The prioritization scheme gives marking an I/O port a higher priority over activity (i.e., traffic) and idle port signaling, and gives faulting the highest priority of all other status conditions. Table 2 summarizes the priority among the various status conditions.

TABLE 2

| PRIORITY (ROW/COL) | MARKING | FAULTING |
|---|---|---|
| MARKING: | — | FAULTING |
| FAULTING: | FAULTING | — |
| IDLE PORT: | MARKING | FAULTING |
| ACTIVE PORT: | MARKING | FAULTING |

Logic for controlling the illumination of the LED(s) depends upon the particular storage platforms. Some storage platforms, such as Fibre Channel, employ a diplex field programmable gate array (FPGA) to couple a high-frequency signal (i.e., a Fibre Channel 8B/10B encoded signal) and a low-frequency signal onto a pair of conductors. One implementation of a diplexer is described in U.S. Pat. No. 5,901,151, the entirety of which is incorporated by reference herein. For storage platforms with a diplex FPGA, the logic for controlling the mark and fault LED-signaling patterns is incorporated into the diplex FPGA.

Other storage platforms, such as 1 Gigabit Ethernet, do not have a diplex FPGA. For these storage platforms, the I/O modules have LED control circuitry for generating the mark and fault LED-signaling patterns. In addition, Ethernet I/O modules, for example, include an Ethernet chipset that produces the link and activity signals. The LED control circuitry intercepts and integrates these Ethernet link and activity signals with the LED-signaling patterns of marking and faulting, as described in more detail below.

Figure 3:
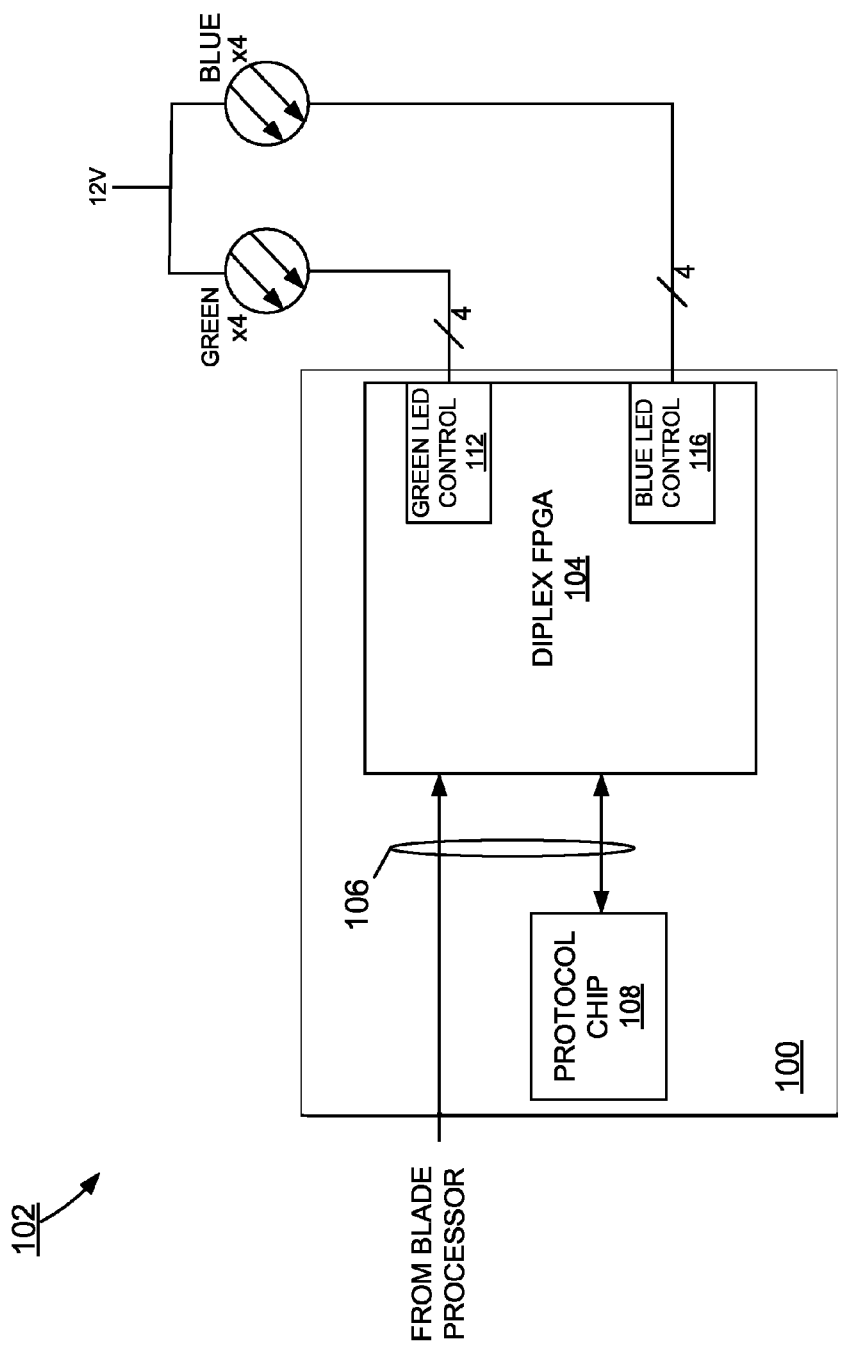
FIG. 3 is a diagram of an embodiment of LED control logic for controlling the marking and faulting signaling patterns for each LED in an I/O port having diplex circuitry.

FIG. 3 shows an embodiment of LED control logic 100 of an I/O module having a diplex FPGA 104, examples of which are Fibre Channel and SAS I/O modules. The LED control logic 100 includes a protocol device 108 in communication with the diplex FPGA 104. The protocol device 108 is particular to the type of I/O technology and provides the interface for communicating in accordance with that particular protocol. The protocol device 108 sends commands to the diplex FPGA 104 over a serial RS232 interface 106 to implement standard control of the LEDs (e.g., to signify link speed) of the I/O ports of the I/O module 102. The diplex FPGA 104 also receives commands from a CPU module of the host blade 12 over the RS232 interface 106 for implementing marking and faulting.

The diplex FPGA 104 includes logic 112 for controlling the green LED associated with each I/O port in the I/O module (here, e.g., 4 in number) and logic 116 for controlling the blue LED associated each I/O port (here, also 4 in number). In response to commands received from the host blade 12, which override commands from the protocol device 108 in accordance with the prioritization scheme, the green LED logic 112 and blue LED logic 116 blink the LEDs, alternately or synchronously, at a defined flash rate, to implement either marking or faulting, as directed. In addition, the diplex FPGA 104 can mark an I/O port although the I/O port may have no established link.

Figure 4:
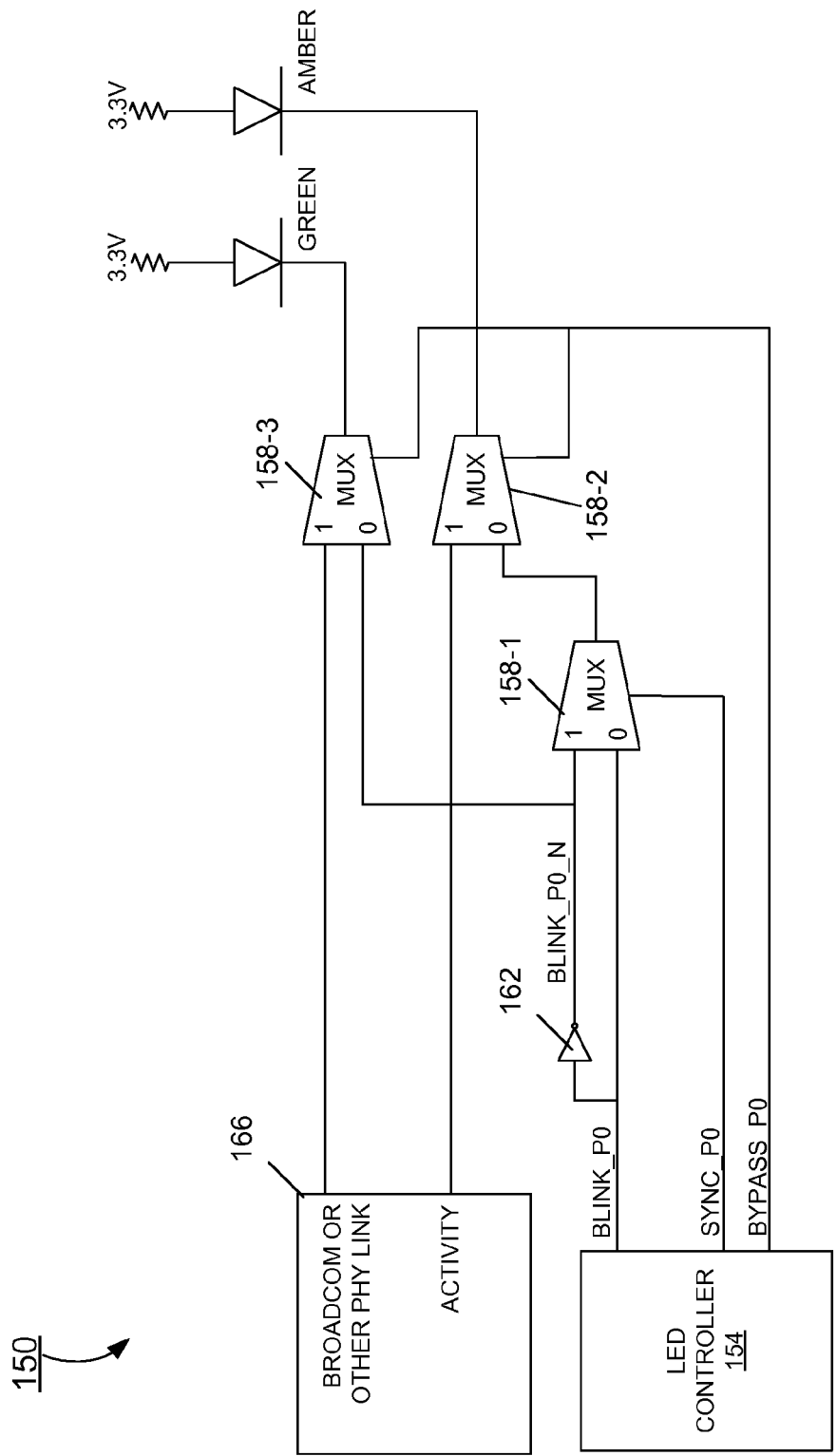
FIG. 4 is a diagram of an embodiment of LED control logic for controlling the marking and faulting signaling patterns for each LED in an I/O port lacking diplex circuitry.

FIG. 4 shows an embodiment of LED control logic 150 for marking and faulting I/O ports of an I/O module that lacks a diplex FPGA and has a protocol device 166 (e.g., an Ethernet chipset) that generates link and activity signals. Examples of such I/O modules include Ethernet I/O modules and FICON I/O modules. The LED control logic 150 includes an LED controller 154 in communication with three multiplexers 158-1, 158-2, and 158-3. The LED controller 154 can be implemented using an I²C device, PCA9552, manufactured by Phillips Semiconductors of Eindhoven, The Netherlands. A single such I²C device can be used to control the LED-signaling patterns for 4 I/O ports. In one embodiment, a GPIO (General Purpose I/O) device (on a CPU module) sends commands to the LED controller 154 over an I²C bus—every I/O module is coupled to this I²C bus.

For each I/O port, the LED controller 154 generates a blink signal (BLINK), a sync signal (SYNC), and a bypass signal (BYPASS). The LED controller 154 uses the blink signal to illuminate each LED in accordance with the defined flash rate, the sync signal to determine whether the LEDs blink alternately or synchronously, and the bypass signal to select between phy-related signals generated by the protocol device 166 and the marking and faulting signals generated by the LED controller 154, in accordance with the above-described prioritization scheme. In addition, the LED controller 154 can mark an I/O port although the protocol device 166 is not generating any phy-related signals for the I/O port (i.e., the I/O port has neither an established link nor any link activity).

In FIG. 4, signals for only one port (P0) are being shown to simplify the illustration. The blink signal passes to an input terminal of the multiplexer 158-1 and to the input terminal of an inverter 162. The inverted blink signal (BLINK_N) passes from the inverter 162 to the other input terminal of the multiplexer 158-1. The sync signal passes to the select terminal of the multiplexer 158-1, to choose between the blink and the inverted blink signals.

The selected signal (i.e., either the blink signal or the inverted blink signal) passes from the output terminal of the multiplexer 158-1 to one of the input terminals of the multiplexer 158-2. The other input terminal of the multiplexer 158-2 receives an activity signal from the protocol device 166. The bypass signal passes from the LED controller 154 to the select terminal of the multiplexer 158-2, to select between the activity signal and either of the blink or inverted blink signals. The output signal produced by the multiplexer 158-2 controls illumination of the amber LED.

The inverted blink signal also passes to one of the input terminals of the multiplexer 158-3. The other input terminal of the multiplexer 158-3 receives a link signal from the protocol device 166. The bypass signal generated by the LED controller 154 passes to the select terminal of the multiplexer 158-3, to select between the link signal and inverted blink signal. The output signal produced by the multiplexer 158-3 controls illumination of the green LED.

The LED control logic 150 shown in FIG. 4 is merely exemplary. Various other hardware and software implementations may be used to achieve the marking and faulting mechanisms and their prioritization, as described herein.

Aspects of the present invention may be embodied in hardware, firmware, or software (i.e., program code). Program code may be embodied as computer-executable instructions on or in one or more articles of manufacture, or in or on computer-readable medium. A computer, computing system, or computer system, as used herein, is any programmable machine or device that inputs, processes, and outputs instructions, commands, or data. In general, any standard or proprietary, programming or interpretive language can be used to produce the computer-executable instructions. Examples of such languages include C, C++, Pascal, JAVA, BASIC, Visual Basic, and C#.

Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof. The computer-executable instructions may be stored as, e.g., source code, object code, interpretive code, executable code, or combinations thereof. Further, although described predominantly as software, embodiments of the described invention may be implemented using hardware (digital or analog), firmware, software, or a combination thereof.

While the invention has been shown and described with reference to specific preferred embodiments, it should be understood by those skilled in the art that various changes in form and detail may be made therein without departing from the spirit and scope of the invention as defined by the following claims. For example, although the present invention advantageously uses existing LEDs to implement marking and faulting, one or more additional LEDs of different colors could be placed near the I/O ports, and flashed in accordance with the marking and faulting principles illustrated herein.

What is claimed is:

1. In an electronics system having an I/O module with an I/O port, a method for marking and faulting the I/O port, the method comprising:
   associating a light-emitting system with the I/O port, the light-emitting system being capable of emitting a plurality of different colors at the I/O port in order to produce at least three different status indicators for the I/O port, the at least three different status indicators including marking the I/O port, faulting the I/O port, and showing an activity level of the I/O port;
   emitting, by the light-emitting system, at least one of the plurality of different colors at a first rate to produce a first status indicator for the I/O port;
   alternately emitting, by the light-emitting system, each color of the plurality of different colors at a second rate to produce a second status indicator for the I/O port, wherein one of the first and second status indicators is for marking the I/O port irrespective of whether the I/O port has an established link and the other of the first and second status indicators is for faulting the I/O port;
   giving priority to faulting the I/O port over both marking the I/O port and showing the activity level of the I/O port when either marking the I/O port or showing the activity level of the I/O port occurs simultaneously with faulting the I/O port; and
   giving priority to marking the I/O port over showing the activity level of the I/O port when both marking the I/O port and showing the activity level of the I/O port occur simultaneously.

2. The method of claim 1, wherein the first status indicator is for marking the I/O port and the second status indicator is for faulting the I/O port.

3. The method of claim 1, wherein the light-emitting system includes only one light-emitting device (LED), the one LED being a multicolor LED, and wherein the step of emitting at least one color includes selecting one of the colors of the multicolor LED for blinking at the first rate.

4. The method of claim 1, wherein the light-emitting system includes only one light-emitting device (LED), the one LED being a multicolor LED, and wherein the step of alternately emitting each color includes alternately blinking each color of the multicolor LED at the second rate.

5. The method of claim 1, wherein the light-emitting system includes multiple light-emitting devices (LED) of different colors, and wherein the step of emitting at least one color includes blinking every one of the multiple LEDs synchronously at the first rate.

6. The method of claim 1, wherein the light-emitting system includes multiple light-emitting devices (LED) of different colors, and wherein the step of alternately blinking each color includes alternately blinking each LED at the second rate.

7. The method of claim 1, where each rate is 1 Hz.

8. The method of claim 1, further comprising the step of intercepting activity and link signals sent by a protocol device to the light-emitting system.

9. An electronics system comprising:
   an I/O module with an I/O port;
   a light-emitting system associated with the I/O port, the light-emitting system being capable of emitting a plurality of different colors near the I/O port in order to produce at least three different status indicators for the I/O port, the at least three different status indicators including marking the I/O port, faulting the I/O port, and showing an activity level of the I/O port;
   logic for emitting at least one of the plurality of different colors from the light-emitting system at a first rate to produce a first status indicator for the I/O port;
   logic for alternately emitting each color of the plurality of different colors from the light-emitting system at a second rate to produce a second status indicator for the I/O port, wherein one of the first and second status indicators is for marking the I/O port irrespective of whether the I/O port has an established link and the other of the first and second status indicators is for faulting the I/O port;
   logic giving priority to faulting the I/O port over both marking the I/O port and showing the activity level of the I/O port when either marking the I/O port or showing the activity level of the I/O port occurs simultaneously with faulting the I/O port; and
   logic giving priority to marking the I/O port over showing the activity level of the I/O port when both marking the I/O port and showing the activity level of the I/O port occur simultaneously.

10. The electronics system of claim 9, wherein the first status indicator is for marking the I/O port and the second status indicator is for faulting the I/O port.

11. The electronics system of claim 9, wherein the light-emitting system includes only one light-emitting device (LED), the one LED being a multicolor LED, and wherein the logic for emitting at least one color includes logic for selecting one of the colors of the multicolor LED to blink at the first rate.

12. The electronics system of claim 9, wherein the light-emitting system includes only one light-emitting device (LED), the one LED being a multicolor LED, and wherein the logic for alternately emitting each color includes logic for alternately blinking each color of the multicolor LED at the second rate.

13. The electronics system of claim 9, wherein the light-emitting system includes multiple light-emitting devices (LED) of different colors, and wherein the logic for emitting at least one color includes logic for blinking every one of the multiple LEDs synchronously at the first rate.

14. The electronics system of claim 9, wherein the light-emitting system includes multiple light-emitting devices (LED) of different colors, and wherein the logic for alternately blinking each color includes logic for alternately blinking each LED at the second rate.

15. The electronics system of claim 9, where each rate is 1 Hz.

16. The electronics system of claim 9, further comprising logic for intercepting activity and link signals sent by a protocol device to the light-emitting system.

17. The electronics system of claim 9, wherein the I/O module comprises an LED controller that is in communication with the light-emitting system to control emission of color in accordance with marking and faulting commands received over an I$^2$C bus.

18. The electronics system of claim 9, wherein the I/O module comprises a diplex field programmable gate array that is in communication with the light-emitting system to control emission of color in accordance with marking and faulting commands received over an RS232 interface.

19. A method of providing multiple status indicators for an I/O port, the method comprising:
- associating a light-emitting system with the I/O port, the light-emitting system being capable of emitting a plurality of different colors at the I/O port to provide at least three different status indicators for the I/O port, including a first status indicator for marking the I/O port, a second status indicator for faulting the I/O port, and a third status indicator for showing an activity level of the I/O port;
- producing the first status indicator for faulting the I/O port whenever faulting the I/O port occurs simultaneously with either one of marking the I/O port and showing the activity level of the I/O port; and
- producing the second status indicator for marking the I/O port when both marking the I/O port and showing the activity level of the I/O port occur simultaneously while the I/O port is not faulting.

* * * * *